United States Patent
Huenig et al.

(10) Patent No.: US 8,034,415 B2
(45) Date of Patent: Oct. 11, 2011

(54) FORMALDEHYDE-FREE PHENOLIC RESIN BINDER

(75) Inventors: Hagen Huenig, Ladenburg (DE); Eva Wagner, Altrip (DE)

(73) Assignee: Saint-Gobain Isover, Courbevoie (FR)

( * ) Notice: Subject to any disclaimer, the term of this patent is extended or adjusted under 35 U.S.C. 154(b) by 600 days.

(21) Appl. No.: 12/095,081

(22) PCT Filed: Nov. 27, 2006

(86) PCT No.: PCT/EP2006/068934
§ 371 (c)(1),
(2), (4) Date: Aug. 27, 2008

(87) PCT Pub. No.: WO2007/060237
PCT Pub. Date: May 31, 2007

(65) Prior Publication Data
US 2009/0304919 A1 Dec. 10, 2009

(30) Foreign Application Priority Data
Nov. 28, 2005 (DE) .......... 10 2005 056 792

(51) Int. Cl.
*B05D 3/02* (2006.01)

(52) U.S. Cl. .......... 427/372.2; 427/384; 427/385.5; 427/389.8; 427/421.1; 427/427.4

(58) Field of Classification Search .......... None
See application file for complete search history.

(56) References Cited

U.S. PATENT DOCUMENTS

| | | | |
|---|---|---|---|
| 4,832,748 A | 5/1989 | Tawara et al. | |
| 7,807,771 B2 * | 10/2010 | Swift et al. .......... | 527/312 |
| 2003/0224119 A1 | 12/2003 | Coventry-Saylor | |
| 2004/0197484 A1 | 10/2004 | Yoshida | |
| 2009/0036011 A1 * | 2/2009 | Hunig et al. .......... | 442/180 |
| 2010/0175826 A1 * | 7/2010 | Huenig et al. .......... | 156/296 |

FOREIGN PATENT DOCUMENTS
GB 1 457 216 12/1976
* cited by examiner

*Primary Examiner* — Erma Cameron
(74) *Attorney, Agent, or Firm* — Oblon, Spivak, McClelland, Maier & Neustadt, L.L.P.

(57) ABSTRACT

The present invention concerns a composition containing: an aqueous dispersion of at least one phenol-formaldehyde resin; at least one amine compound, wherein the molecular mass of the amine compound does not exceed approximately 20 000 g/mole, at least one activated silane, as well as at least one aromatic hydroxyl compound. The composition may be employed as a formaldehyde-free binder for the manufacture of mineral wool.

21 Claims, 2 Drawing Sheets

FORMALDEHYDE-FREE PHENOLIC RESIN BINDER

The present application claims domestic priority to PCT Application No. EP06/68934, filed on Nov. 27, 2006, and claims foreign priority to German Application No. 102005056792.4, filed on Nov. 28, 2005. The text of both PCT/EP06/68934 and DE/102005056792.4 are herein incorporated by reference.

The present invention concerns a formaldehyde-free composition comprising a phenolic resin to be used for the manufacture of insulation products made of mineral wool, a binder for mineral wool, a method for the manufacture of mineral wool bound in a formaldehyde-free manner, as well as the bound mineral wool product thus obtained.

In the manufacture of bound mineral wool products from a molten glass or mineral material it has for a long time been accepted practice to apply, following fiberization of the molten material, a binder on the basis of phenol-formaldehyde resin on the fibers while they are still hot. This preferably takes place in the chute following fiberization, e.g. in accordance with the blast drawing process according to DE 35 09 426 A1.

Here a phenol-formaldehyde resin, being the best-known binder of the prior art, is preferably sprayed onto the fibers in the form of an aqueous solution, or dispersion, wherein the phenol-formaldehyde resin then begins to polymerize on the fiber surface owing to the still relatively high temperatures of the fibers, and connects the single fibers with each other as a result of the polymerization process, particularly at crossing points of fibers, inasmuch as the fibers lying on top of each other at a crossing point are more or less embedded there by solidified droplets of resin, and thus the relative mobility of the single fibers is initially impeded and later on prevented entirely upon curing by means of hot gases, for instance inside a tunnel furnace.

A like binder is described, e.g., in U.S. Pat. No. 3,231,349. For reasons of protection of the environment as well as for reasons of workplace safety, more and more attempts are meanwhile being undertaken to replace the conventional phenolic resin binders with alternative, formaldehyde-free binders because of their formaldehyde content and their formaldehyde emission.

Thus for example EP 0 583 086 B2 describes a curable, formaldehyde-free, aqueous binder composition for glass fibers on the basis of polymer polyacids containing at least two carboxylic acid groups or anhydride groups, which comprises a polyol containing at least two hydroxyl groups and a phosphorus-containing catalyst, wherein a ratio of the number of equivalents of COOH group to OH group must be from 0:0.01 to 1:3.

A polymer polyacid described in EP 0 583 086 B2 is, for instance, polyacrylic acid.

A preferably used polyol is β-hydroxyalkylamide, e.g., [N,N-di(β-hydroxyethyl)]-adipamide, however it is also possible to use, e.g., ethylene glycol, glycerol, pentaerythritol, trimethylol propane, sorbitol, sucrose, glucose, resorcinol, catechol, pyrogallol, glycolated ureas, 1,4-cyclohexane diol, diethanolamine or triethanolamine.

Similar binder compositions for mineral fibers are, e.g., also known from U.S. Pat. No. 6,331,350 B1, EP 0 990 727 A1, EP 0 990 728 A1, and EP 0 990 729 A1. The listed documents of the prior art also use a polyacrylic acid as a polymer polyacid. By way of a polyol, alkanolamines as well as glycols are also used there.

In addition, EP 0 882 074 B1 describes binder compositions for mineral fibers on the basis of polyacrylic acids and glycols as polyols.

All of the binder compositions of the prior art constituting an alternative for phenol-formaldehyde resins are, however, currently only conditionally suited for the manufacture of mineral wool products, mainly due to their lack of water resistance, so that, for example, the binders based on polyacrylate resins have hitherto generally been barred from practical use for the manufacture of mineral wool products.

The chemical industry has meanwhile furnished pre-condensated phenol-formaldehyde resins that do—in a sense— already present a reduced content of free formaldehyde, however still have to be subsequently crosslinked with additional formaldehyde in order to improve the properties of resin and binder, particularly water resistance. As a result, emissions of formaldehyde due to its high vapor pressure and the relatively slow crosslinking reaction between polymer chains are nearly unavoidable.

Starting out from the prior art of the commercially available phenolic resin binders reduced in formaldehyde, the applicant has set itself the task for the purposes of mineral wool manufacture in the development of novel, environmentally compatible binders to arrive at formaldehyde-free binders with the classical phenol-formaldehyde resins despite their formaldehyde content.

According to the present invention, this object is achieved through a formaldehyde-free composition comprising an aqueous dispersion of a phenol-formaldehyde resin, a binder comprising said composition and a method for the manufacture of mineral wool bound in a formaldehyde-free manner.

In particular, the present invention concerns a composition containing:
  an aqueous dispersion of at least one phenol-formaldehyde resin;
  at least one amine compound of the general formula (1)

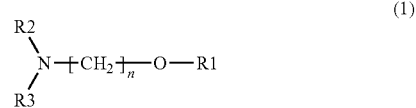

wherein:
  R1, R2 and R3 independently of each other, equal or not equal, corresponds to H and R1 of the general formula (2):

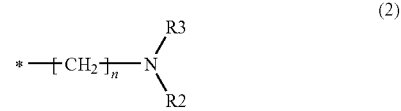

with a value for n of 2-10, and
  R2 and R3, independently of each other, are equal or not equal to H or correspond to the general formula (3):

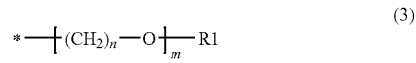

wherein m may assume a value of 1-50, and the molecular mass of the amine compound does not exceed approximately 20 000 g/mole;

at least one activated silane, which may be obtained by a conversion of a silane, selected from the group: mono-, di- and trialkoxysilanes having one $C_1$ to $C_8$ alkoxy group, wherein the alkoxysilane carries at least one $C_2$ to $C_{10}$ aminoalkyl group or a $C_2$ to $C_{10}$ N-aminoalkyl group; 3(2-aminoethylamino)propyltrimethoxysilane; $(MeO)_3$—Si—$(CH_2)_3$—NH—$(CH_2)_3$—Si—$(OMe)_3$; 3-aminopropylsilanetriol; aminosilane with ethoxylated nonylphenolate; phenyl-$CH_2$—NH—$(CH_2)_3$—NH—$(CH_2)_3$—Si—$(OMe)_3$*HCl; as well as mixtures thereof;

with an enolizable ketone having at least one carbonyl group or a ketone having at least one OH group, wherein the ketone contains 3 to 12 C atoms, as well as at least one aromatic hydroxyl compound selected from the group consisting of: dihydroxybenzenes and their hydroxymethylated compounds; trihydroxybenzenes and their mono- and dihydroxymethylated compounds; C-alkylated compounds of phenol or of resorcin; autocondensation products of the hydroxymethylated compounds; activated heterocycles and their mono- or dialkylated compounds or their anellated derivatives; di- and trihydroxy derivatives of naphthalene; as well as mixtures thereof or mixtures containing these substances.

Particularly due to the fact that the composition of the invention contains at least one aromatic hydroxyl compound, it is possible to trap free formaldehyde from the used resin and chemically convert it non-reversibly under the given conditions into such molecules which themselves are not capable of participating in the crosslinking reaction of the resin. Thanks to this measure it is one the one hand not necessary any more to add additional formaldehyde for subsequent crosslinking, and on the other hand free formaldehyde contained in the phenolic resin is bound chemically. Thus free formaldehyde is present neither in the resin nor in a mineral wool product bound by it.

As aromatic hydroxyl compounds those are suited which are in particular selected from the group consisting of: dihydroxybenzenes, particularly 1,3-dihydroxybenzene, 1,2-dihydroxybenzene or 1,4-dihydroxybenzene, as well as their hydroxymethylated compounds, in particular hydroxymethylated derivatives of resorcin or benzocatechin, such as 2,4-dihydroxyphenylmethanol or 2,3-dihydroxyphenylmethanol, but also multihydroxymethylated derivatives of these activated aromatic substances, e.g., 2,3-dihydroxy-4-hydroxymethylphenyl-methanol or 4,5-dihydroxy-2-hydroxymethylphenylmethanol; trihydroxybenzenes, particularly 1,3,5-trihydroxybenzene or 1,2,3-trihydroxybenzene, their mono- and dihydroxymethylated compounds, such as 2,3,4-trihydroxyphenylmethanol or 2,4,6-trihydroxyphenylmethanol; C-alkylated compounds of phenol or of resorcin, e.g., 1-hydroxy-2-methylbenzene, 1-hydroxy-3-methylbenzene, 1-hydroxy-4-methyl-benzene or 2-methylresorcin; autocondensation products of the hydroxymethylated compounds, such as bis-2,4-dihydroxyphenylmethane; activated heterocycles, e.g., pyrrole, thiophene, their mono- or dialkylated compounds or their anellated derivatives, such as indole or thioindole; di- and trihydroxyderivatives of naphthalene. It is, of course, also possible to use mixtures of these substances and mixtures containing them.

The modification on a complex multi-substance mixture—such as a phenol-formaldehyde resin or a binder produced therefrom for mineral wool with different additives—constitutes a difficult set of problems, particularly inasmuch as the resin constitutes a very unstable intermediate product. Depending on the usually unknown origin of this preparation, the reactive components are present in various concentrations and thus critically influence the material properties of the finished product. The main constituents of a typical phenol-formaldehyde resin and their effect as a polymer constitutional unit are shown in the following schematic formulae:

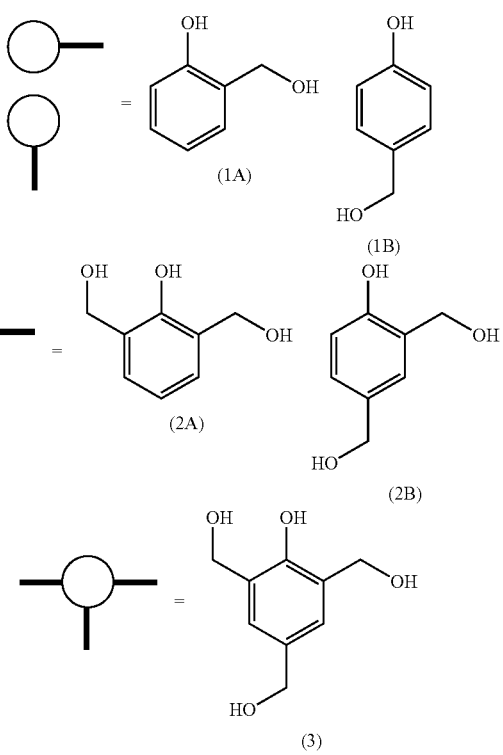

Depending on the ratio of the single constituents, a resin polymer having various properties is formed.

It is possible to discern various cases of polymerization and thus of the resulting polymers having different properties, which are represented schematically in the following:

Case 1:

Where predominantly only simple constitutional units are present, a chain-type polymer having few linking sites between the single chains is built up, i.e., the simple constitutional units polymerize with themselves, which fact may be represented schematically by the following schematic formulae by using the above defined formula abbreviations:

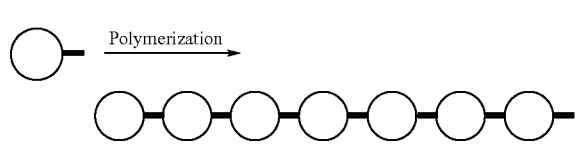

In the prior art such essentially linear and hardly branched polymer chains were subsequently crosslinked with formaldehyde in order to achieve an enhanced water resistance. The inventors intend to avoid this addition of formaldehyde. Particularly the reason for this is that formaldehyde is a volatile substance, and that the latter has a tendency to desorption under the production conditions of an elevated temperature rather than entering the comparatively slow crosslinking reaction with the polymer chains.

Case 2:

Where a mixture of simple- and double-substituted constitutional units exists which polymerize with themselves, one obtains a polymer having more strongly reticulated chains, which may be represented schematically by the following schematic formulae by using the above defined formula abbreviations:

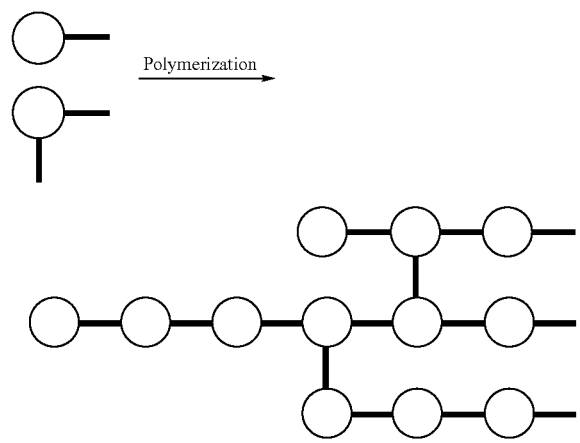

The resistance of such binder resins and of mineral wool products thereby manufactured against swelling processes due to moisture, such as on the construction site during bad weather or in the outdoor range, is enhanced in comparison with the non-crosslinked polymer chains.

Case 3:

In the third case, three simple-, double- and triple-substituted compounds are present in parallel which polymerize with themselves, which may be represented schematically by the following schematic formulae by using the above defined formula abbreviations:

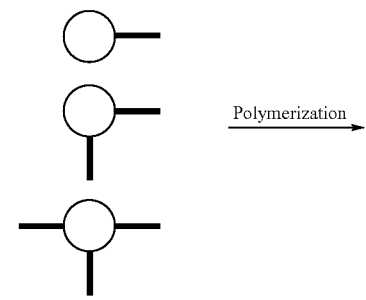

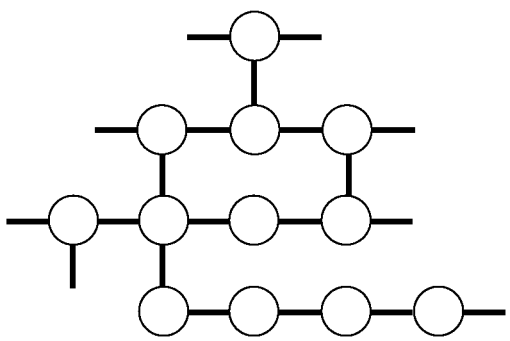

The resistance of such a plastic material against swelling is very high. Nevertheless, the storing capability and the processing time may be reduced depending on the concentration of the higher-substituted constitutional units depending on the pH value and the concentration of formaldehyde or of compounds releasing it, respectively, When viewed globally, however, a resin in accordance with Case 3 is desirable, yet in the prior art this could only be achieved with formaldehyde-containing phenolic resins which still release small quantities of formaldehyde.

As a result of the addition of at least one aromatic hydroxyl compound it is on the one hand possible to trap excess formaldehyde that is contained in the used resin, so that its liberation is prevented, and on the other hand the compounds resulting from the reaction of the formaldehyde with the aromatic hydroxide form molecules that are very similar to the molecule species of Case 3, which shall be shown in the following by the example of resorcin:

Chemical Trapping of Free Formaldehyde:

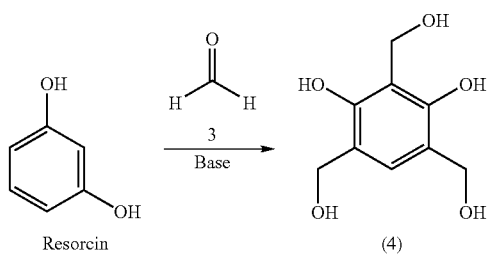

From the following schematic formulae it may be seen that the polymer constitutional unit (3) has a high similarity with the molecule species (4) resulting from the trapping reaction:

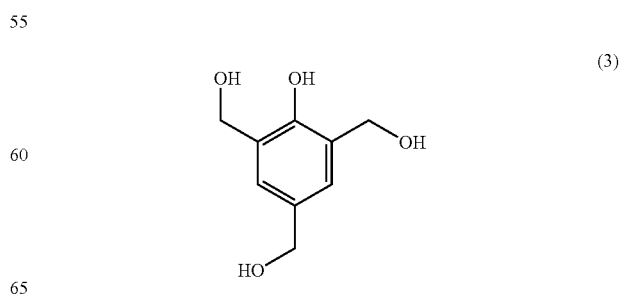

(4)

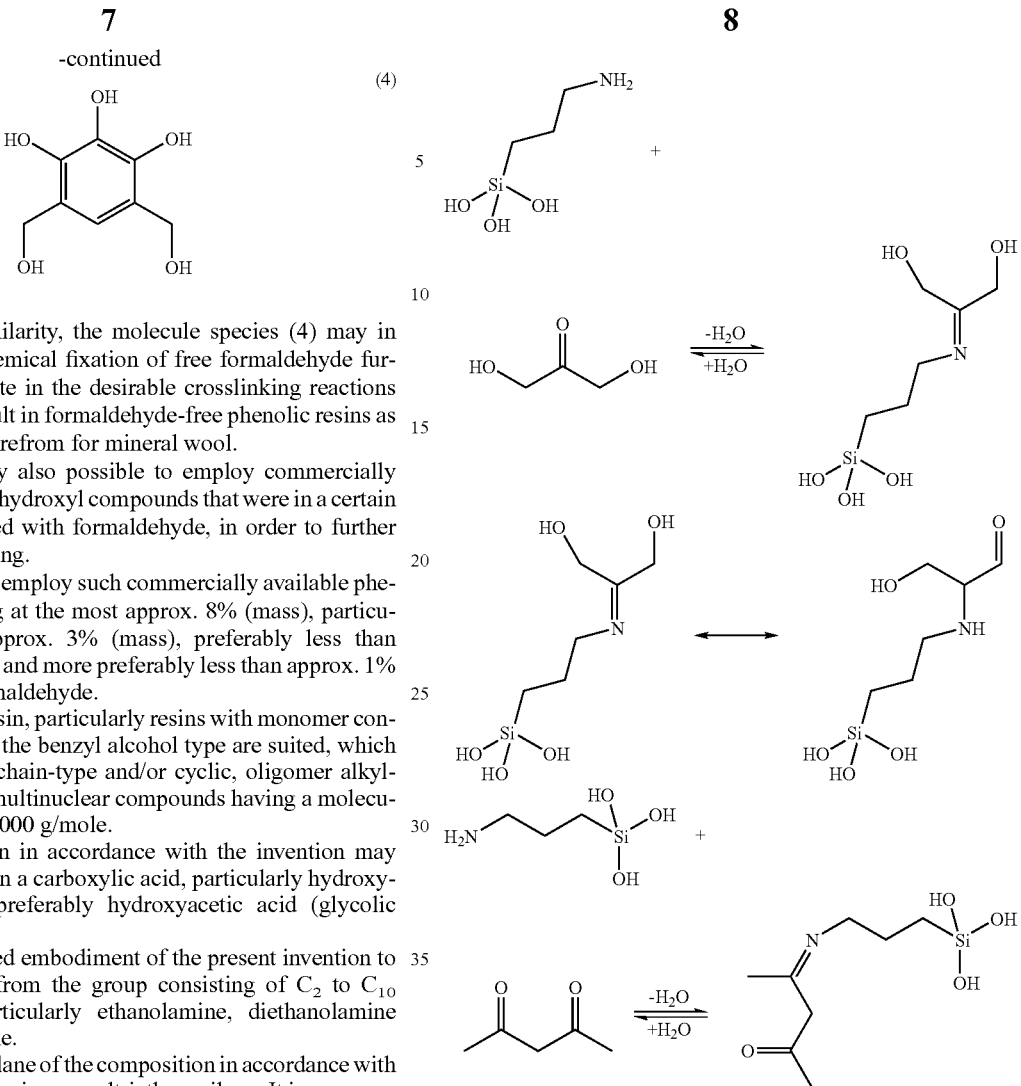

Due to this similarity, the molecule species (4) may in addition to the chemical fixation of free formaldehyde furthermore participate in the desirable crosslinking reactions and thus lastly result in formaldehyde-free phenolic resins as well as binders therefrom for mineral wool.

It is accordingly also possible to employ commercially available aromatic hydroxyl compounds that were in a certain part already reacted with formaldehyde, in order to further push the crosslinking.

It is preferred to employ such commercially available phenolic resins having at the most approx. 8% (mass), particularly less than approx. 3% (mass), preferably less than approx. 2% (mass) and more preferably less than approx. 1% (mass) of free formaldehyde.

As a phenolic resin, particularly resins with monomer constitutional units of the benzyl alcohol type are suited, which may also contain chain-type and/or cyclic, oligomer alkyl-bridged aromatic multinuclear compounds having a molecular mass of up to 3000 g/mole.

The composition in accordance with the invention may additionally contain a carboxylic acid, particularly hydroxycarboxylic acid, preferably hydroxyacetic acid (glycolic acid).

It is one preferred embodiment of the present invention to select the amine from the group consisting of $C_2$ to $C_{10}$ alkanolamine, particularly ethanolamine, diethanolamine and triethanolamine.

One preferred silane of the composition in accordance with the invention is 3-aminopropyltriethoxysilane. It is commercially available at a low cost.

As ketones for the manufacture of the activated silane, dihydroxyacetone or acetylacetone are preferably employed due to their easy availability, however the activated silane may also be produced with an enolizable ketone having at least one carbonyl group or a ketone having at least one OH group, wherein the ketone contains 3 to 12 C atoms.

Furthermore it is frequently desirable for the composition to additionally contain at least one crosslinking agent, with those being preferred that are selected from the group consisting of: glycerol, polyols, neopentylglycol, trimethylallylamine, 1,3,5-triallyl-2-methoxybenzene, 1,1,1-tris(4-hydroxyphenyl)-ethane, triallylneopentylether, pentaerythrite, sugars, sugar molasse, particularly turnip molasse; as well as mixtures thereof.

It is particularly preferred if the composition in accordance with the invention has a pH value in the range of approx. 7.0 to 10, particularly 8 to 9. Hereby it is on the one hand ensured that conduits and nozzles, particularly spraying nozzles, are less subjected to corrosion. On the other hand compositions in the preferred pH range do by far not attack the mineral or glass fiber to the extent as the prior-art compositions on polyacrylate basis that are distinctly more acidic.

Without being bound thereto, the activation of the silane with the carbonyl compound possibly appears to unfold in accordance with the following reaction scheme, as is shown by two different carbonyl compounds:

As a result of the activation of the silane—in the above reaction scheme by way of the example of the γ-aminopropylsilanetriol having resulted from hydrolysis von 3-aminopropyltriethoxysilane—by reaction with an enolizable ketone having at least one carbonyl group or a ketone having at least one OH group, wherein the ketone contains 3 to 12 C atoms, there is formed on the activated molecule a "resin side" which is formed by the N part, in addition to a glass side formed by the Si part.

In the prior art, the amino group of the silane was reacted with formaldehyde into a Schiff's base which in turn reacted with the phenol-formaldehyde resin.

Thus a formaldehyde content of the binder as required in the prior art is not necessary any more because the activated silane carries an N-containing molecule portion which is capable of coupling to the resin—in accordance with the invention to the phenolic resin or to amine functions of nitrogen-containing polymers—which is thus bound via the silane linker to the glass surface of the hot fiber.

Crosslinking thus takes place both through the described molecule species (4) and through the silane linker.

The reactions of the activated silanes used in accordance with the invention at the glass surface—presently represented by a silica tetrahedron—are in the following shown schematically and exemplarily without being bound thereby:

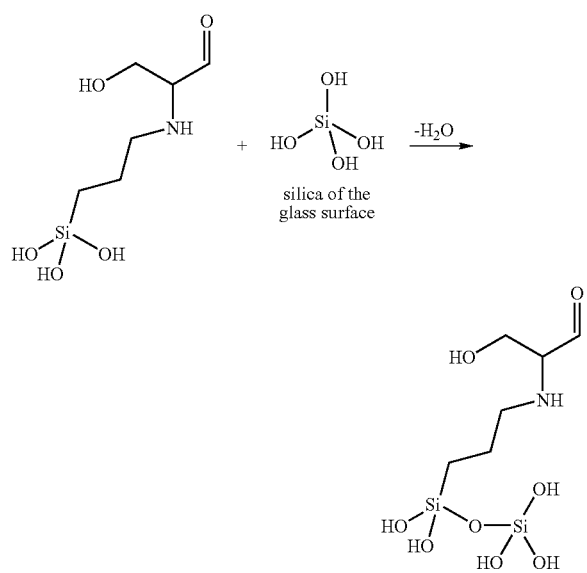

These hydrolytic linkings take place even more rapidly on the fiber while still hot.

Further advantages and features of the present invention become evident from the description of practical examples as well as from the drawings, wherein:

Figure 1:
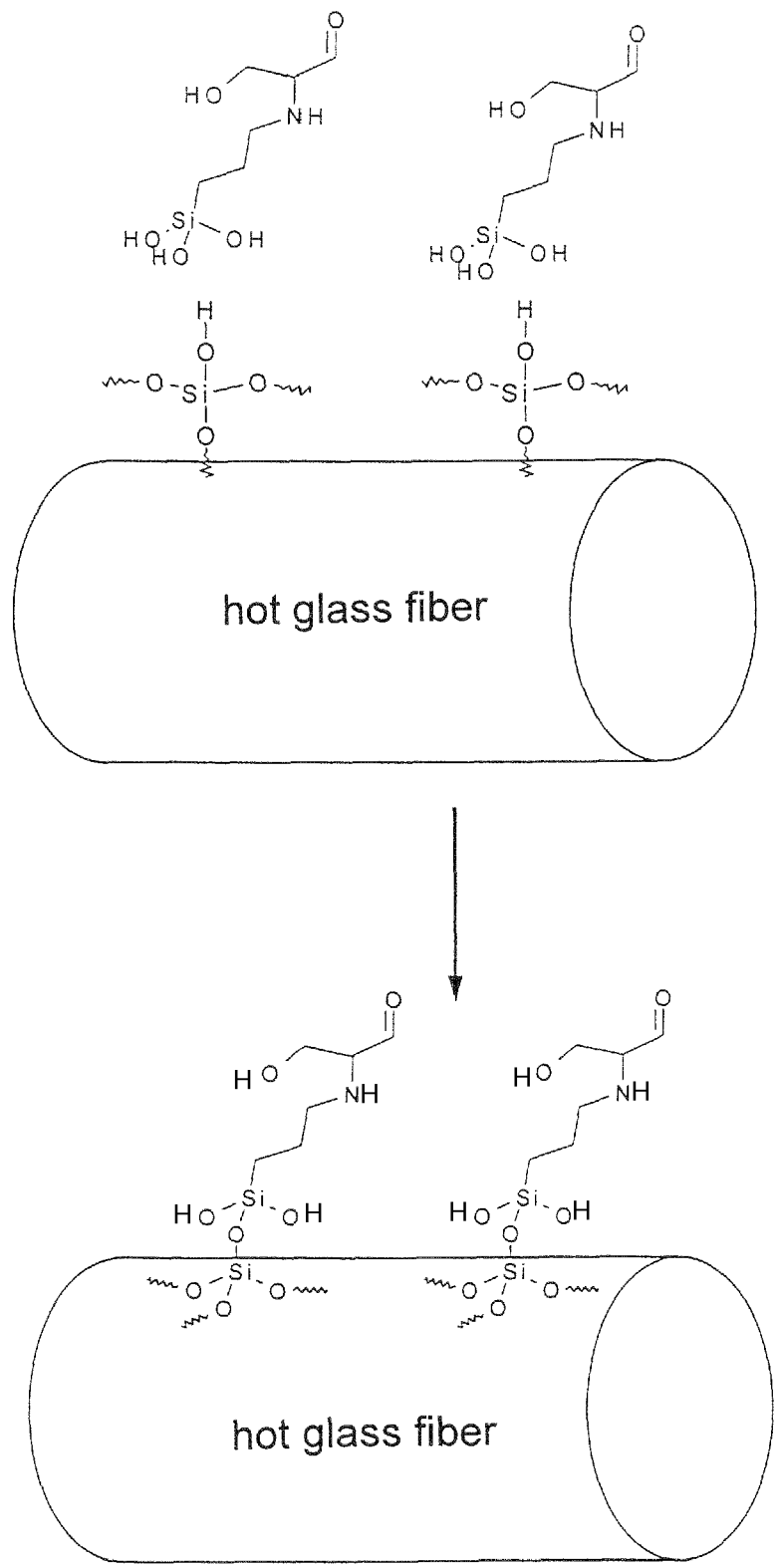
FIG. 1: is a schematic view of silanes coupled to a glass fiber via the Si portion of an activated silane.
Figure 2:
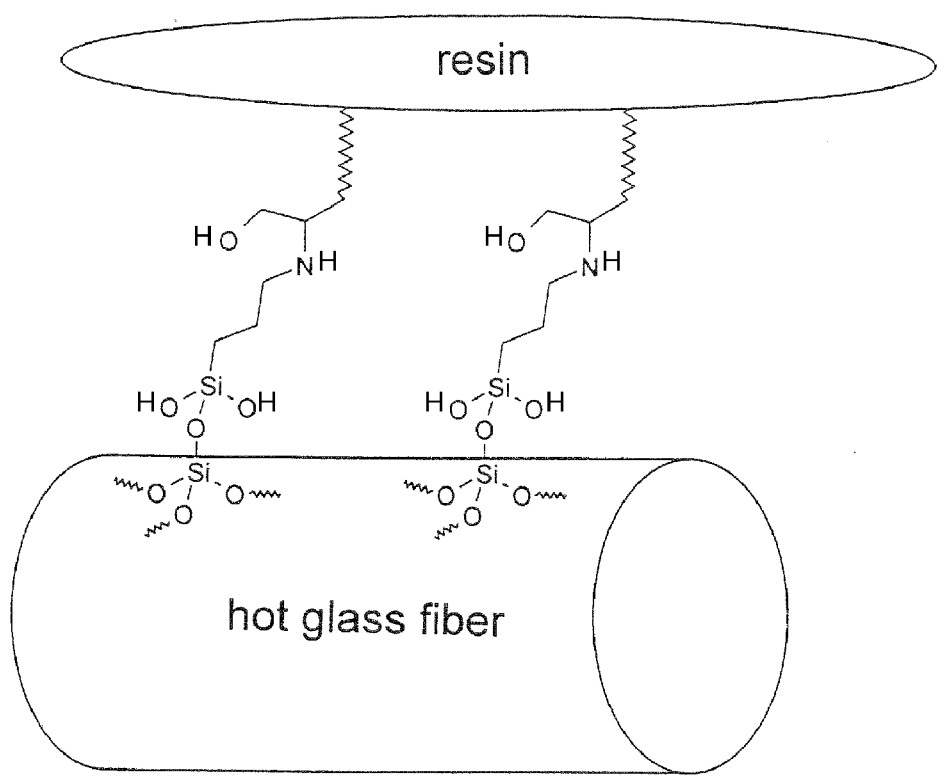
FIG. 2: is a schematic view of a resin bound to a glass surface on a fiber via an activated silane.

The overall context of the composition in accordance with the invention and binder in connection with the manufacture of mineral or glass fibers is once again visualized in FIG. 1 and FIG. 2.

Here the represented molecular arrangement should merely be understood in a schematic manner. Crosslinking reactions will, of course, moreover still take place within the resin such as phenolic resin, in accordance with the above description, for instance with the molecule species (4) as well as the alkanolamine or further additional crosslinking agents.

It is, of course, also possible for unintended secondary reactions to occur, as is true with any polymerization. The contents of FIGS. 1 and 2 may therefore merely be considered to be a model concept which is, however, helpful for an understanding of the invention.

The composition in accordance with the invention is excellently suited as a binder for mineral wool. On the one hand it is thus possible to manufacture positively formaldehyde-free mineral wool products, and on the other hand the cured binders of the invention and thus, of course, also the mineral wool products are water-resistant.

In order to manufacture mineral wool bound in a formaldehyde-free manner by means of the binder of the invention, the binder is applied, following fiberization of a molten mineral material, on the fibers while they are still hot, and the mineral wool product with the applied binder is subjected to a curing process.

Here the binder is applied on the fibers in the chute by spraying the fibers attenuated from the molten mineral material, in particular sprayed on.

A bound mineral wool product manufactured in accordance with the method of the invention satisfies any mechanical and chemical requirements just like a mineral wool product bound by using classical phenol-formaldehyde resin.

PRACTICAL EXAMPLES

The commercially available phenolic resins reduced in formaldehyde were tested on the finished product in accordance with current testing methods. The results were compared with those of a standard phenolic resin. The approaches chosen here shall be set forth by way of the following examples and only represent a small selection of the test results. As will readily be evident to the person having skill in the art, the used substances may be varied in an extraordinary breadth; what is important for the trapping of formaldehyde are solely the pH value and the reactivity of the aromatic substances used. The used resorcin may very easily be replaced with similarly reactive systems such as pyrocatechol, pyrrole or thiophene. Reactivity may conveniently be controlled through the acid-base ratio. Activation of the silane is possible both through the intermediary of carbonyl compounds and heterocyclic Systems such as phthalimide. By the addition of replenishable raw materials such as molasse it is possible to additionally improve the processing friendliness of the resins.

In the named binders a target concentration of approx. 40% total solid matter was generally aspired.

Comparative Example

Binder 1—Standard comparative example: A typical alkali-catalyzed phenolic resin having a total solid matter content of 44% was used. Composition: 150 kg of phenolic resin; 35.5 kg of urea; 1.0 kg of ammonium sulfate; 2.0 kg of ammonia solution (25%); 25.8 kg of 3-aminopropyltriethoxysilane (2%); 44.6 kg of water. The free formaldehyde content 6 hours after addition of the urea was approx. 0.5% (mass).

Activation of the Silane

In the following practical examples of the invention, the following general prescription for the representation of an activated silane is valid:

In a vat including a mechanical stirrer of a suitable size, a part of the dilution water is initially charged. Then the corresponding quantity of the carbonyl compound is added and stirred until complete dissolution. In the case of compounds poorly soluble in water, careful heating is performed, or a dispersant is added under vigorous stirring. The silane is added to the solution, and then stirring is continued until a distinct change of color of the solution. A more intense coloration indicates the formation of the imine as activated silane. The silane thus activated is added to the binder batch. Following homogeneization, the binder is ready for use.

Example 1

Binder 2: A commercially available, non-neutralized phenolic resin having a total solid matter of 43.5% and a proportion of free formaldehyde of approx. 1% (mass) was used.

Composition: 150 kg of phenolic resin; 4.7 kg of resorcin; 0.2 kg of glycolic acid; 0.3 kg of ethanolamine; 0.4 kg of 3-aminopropyltriethoxysilane; 0.2 kg of dihydroxyacetone; 21.3 kg of water.

The pH value of the finished binder is approx. 8.

Example 2

Binder 3: A commercially available, non-neutralized phenolic resin having a total solid matter of 46.5% and a proportion of free formaldehyde of approx. 2% (mass) was used.

Composition: 150 kg of phenolic resin; 11.7 kg of resorcin; 0.4 kg of phloroglucin; 0.2 kg of glycolic acid; 0.7 kg of ethanolamine; 0.4 kg of 3-aminopropyltriethoxysilane; 0.2 kg of dihydroxyacetone; 43.2 kg of water.

The pH value of the finished binder is approx. 8.

Example 3

Binder 4: A commercially available, non-neutralized phenolic resin having a total solid matter of 46.5% and a proportion of free formaldehyde of approx. 2% was used.

Composition: 150 kg of phenolic resin; 11.2 kg of resorcin; 0.4 kg of phloroglucin; 27.9 kg of turnip molasse; 0.2 kg of glycolic acid; 0.8 kg of ethanolamine; 0.5 kg of 3-aminopropyltriethoxysilane; 0.3 kg of dihydroxyacetone; 68.1 kg of water.

The pH value of the finished binder is approx. 8.

Performance of Quality Tests

1. Laboratory Tests 1.1 Decrease of the Free Formaldehyde Content

Initially, the decrease of free formaldehyde following the addition of phloroglucin and resorcin, respectively, is shown in the binders 2-4 in comparison with the standard binder 1 (Table 1).

TABLE 1

Decrease of the free formaldehyde content

| Binder | Starting concentration of free formaldehyde [% (mass)] | Concentration of free formaldehyde after 10 min. [% (mass)] | Concentration of free formaldehyde after 60 min. [% (mass)] |
|---|---|---|---|
| 1 [Comparison] | 8.5 (without urea) | 5.0 (after addition of urea) | 0.5 (6 h after addition of urea) |
| 2 | 1.0 | 0.1 | not detectable |
| 3 | 2.0 | 0.5 | not detectable |
| 4 | 1.8 | 0.4 | not detectable |

2. Tests with Mineral Wool Product Manufactured with the Binders in Accordance with the Invention With the above binders in accordance with Examples 1 to 3, mineral wool products were manufactured wherein the binder is sprayed in the usual manner, following fiberization of the molten material, e.g. in accordance with the blast drawing process, inside the chute on the fibers while they are still hot.

The obtained products were then subjected to a series of examinations that are described in the following. What was generally tested was a façade insulation board having a target bulk density of 75 kg/m³ and a target loss due to burning of 3.7%.

2-1 Adhesion Strength of Insulation Materials in Accordance with German Industrial Standard [DIN] 52274/EN 1607 Before and after Autoclaving From a finished product, parallelepipedic test samples are cut with an edge length of 200×200 mm. Half of the test samples thus obtained are bonded between two steel plates provided with eyelets and torn apart by means of a suitable apparatus. The other part is aged in air saturated with water vapor during 15 min. at 105° C. and subsequently torn apart in the same way. The measured tearing forces provide an indication of the strength of the overall system glass fibers-resin after manufacture and of its resistance under normal conditions of use. In the case of standard products of this class without hydrophobizing agents, residual strengths around 60% after autoclaving are normal. The results are summarized in Table 2.

TABLE 2

Adhesion strength of insulation materials in accordance with DIN 52274/EN 1607 before and after autoclaving

| Binder | Tearing strength after manufacture (in kPa) | Tearing strength after autoclaving (in kPa) | Residual strength (in %) |
|---|---|---|---|
| 1 [Comparison] | 103.5 | 67.3 | 65 |
| 2 | 139.2 | 108.6 | 78 |
| 3 | 157.1 | 133.6 | 85 |
| 4 | 142.7 | 99.9 | 70 |

2.2 Adhesion Strength in Accordance with DIN 52274/EN 1607 of Insulation Materials According to Nordtest For performing these tests, test samples having an edge length of 200×200 mm are cut from a finished product. One part of the test samples is torn in analogy with the autoclave test before ageing. The other part is stored in accordance with the provision of the Nordtest during 7 days at 70° C. and 95% relative humidity, Following re-drying, the strength of the aged sample bodies is determined by tearing apart. An accurately manufactured insulation material should have a residual strength of at least 50% after this very drastic ageing method. The results are represented in Table 3.

TABLE 3

Adhesion strength in accordance with PIN 52274/EN 1607 of insulation materials according to Nordtest

| Binder | Tearing strength after manufacture (in kPa) | Tearing strength according to Nordtest (in kPa) | Residual strength (in %) |
|---|---|---|---|
| 1 [Comparison] | 111.4 | 62.4 | 56 |
| 2 | 135.8 | 88.3 | 65 |
| 3 | 165.2 | 119.0 | 72 |
| 4 | 145.5 | 98.9 | 68 |

Thus the performed tests confirm that the composition in accordance with the invention is not only fundamentally suited as a formaldehyde-free binder for the manufacture of mineral wool, but also practically applicable in accordance with determined product quality, processing capability, and economy. The existing machine equipment need not be modified.

The invention claimed is:

1. A composition comprising:
   a) an aqueous dispersion of at least one phenol-formaldehyde resin;
   b) at least one amine compound of the general formula (1)

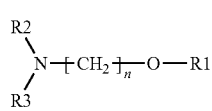  (1)

wherein:
   R1 is H or general formula (2):

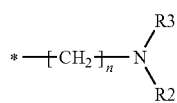  (2)

with a value for n of 2-10, and
   R2 and R3 are, independently, H or general formula (3):

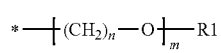  (3)

wherein n is 2-10 and m is 1-50,
   and wherein the molecular mass of the amine compound does not exceed approximately 20,000 g/mole;
   c) at least one activated silane, obtained by a conversion of a silane with an enolizable ketone having at least one carbonyl group or a ketone having at least one OH group, wherein the ketone contains 3 to 12 C atoms, wherein the silane is selected from the group consisting of a mono-, di- and trialkoxysilanes having one $C_1$ to $C_8$ alkoxy group, wherein the alkoxysilane carries at least one $C_2$ to $C_{10}$ aminoalkyl group or a $C_2$ to $C_{10}$ N-aminoalkyl group; 3(2-aminoethylamino)propyltrimethoxysilane; $(MeO)_3$—Si—$(CH_2)_3$—NH—$(CH_2)_3$—Si—$(OMe)_3$; 3-aminopropylsilanetriol; aminosilane with ethoxylated nonylphenolate; phenyl-$CH_2$—NH—$(CH_2)S$—NH—$(CH_2)S$—Si—$(OMe)_3$*HCl; and mixtures thereof; and
   d) at least one aromatic hydroxyl compound.

2. The composition in accordance with claim 1, wherein d) the at least one aromatic hydroxyl compound is selected from the group consisting of a dihydroxybenzene, a trihydroxybenzene and a hydroxylated heterocycle.

3. The composition in accordance with claim 1, wherein the phenol-formaldehyde resin comprises no more than about 8% (mass) of free formaldehyde.

4. The composition in accordance with claim 3, wherein the phenol-formaldehyde resin comprises, at the most, approx. 3% (mass) of free formaldehyde.

5. The composition in accordance with claim 4, wherein the phenol-formaldehyde resin comprises, at the most, approx. 1% (mass) of free formaldehyde.

6. The composition in accordance with claim 1, wherein the phenol-formaldehyde resin comprises monomer constitutional units containing a benzyl alcohol and/or chain and/or cyclic, oligomer alkyl-bridged aromatic multinuclear compounds having a molecular mass of up to 3,000 g/mole.

7. The composition in accordance with claim 1, further comprising a carboxylic acid.

8. The composition in accordance with claim 7, further comprising a hydroxyacetic acid.

9. The composition in accordance with claim 1, wherein the at least one amine compound is a $C_2$ to $C_{10}$ alkanolamine.

10. The composition in accordance with claim 9, wherein the at least one amine compound is selected from the group consisting of ethanolamine, diethanolamine, and triethanolamine.

11. The composition in accordance with claim 1, wherein the silane is 3-aminopropyltriethoxysilane.

12. The composition in accordance with claim 1, wherein the ketone is dihydroxyacetone or acetylacetone.

13. The composition in accordance with claim 1, further comprising at least one crosslinking agent.

14. The composition in accordance with claim 13, wherein the crosslinking agent is selected from the group consisting of: glycerol, polyols, neopentylglycol, thmethylallylamine, 1,3,5-thallyl-2-methoxybenzene, 1,1,1-tris(4-hydroxyphenyl)-ethane, triallylneopentylether, pentaerythrite, sugars, sugar molasses, and mixtures thereof.

15. The composition in accordance with claim 1, having a pH value in the range of approx. 7.0 to 10.

16. The composition in accordance with claim 15, having a pH value in the range of 8 to 9.

17. A binder for mineral wool, comprising the composition in accordance with claim 1.

18. A method for the manufacture of mineral wool, comprising:
    applying the binder of claim 1, following fiberization of a molten mineral material, on fibers while they are still hot, and
    exposing the mineral wool product, with the applied binder, to a curing process.

19. The method in accordance with claim 18, wherein the binder is applied on the fibers in a chute by spraying the fibers attenuated from the molten mineral material.

20. A bound mineral wool product obtained by the method in accordance with claim 18.

21. The composition of claim 1, wherein (d) is at least one aromatic hydroxyl compound selected from the group consisting of a
    dihydroxybenzene, hydroxymethylated dihydroxybenzene, an autocondensation product of a hydroxymethylated dihydroxybenzene;
    trihydroxybenzenes, mono-hydroxymethylated trihydroxybenzene, dihydroxymethylated trihydroxybenzenes; an autocondensation product of dihydroxymethylated trihydroxybenzenes;
    C-alkylated phenol, C-alkylated resorcin, hydroxylated heterocycle, mono- or dialkylated hydroxylated heterocycle, anellated derivative of a hydroxylated heterocycle, a dihydroxy derivative of naphthalene, and a trihydroxy derivative of naphthalene;
    or mixtures thereof.

* * * * *